United States Patent
Wang et al.

(10) Patent No.: US 9,173,118 B2
(45) Date of Patent: Oct. 27, 2015

(54) METHOD AND BASE STATION FOR SELECTING WORKING REMOTE RADIO UNIT FOR USER EQUIPMENT

(71) Applicant: Huawei Technologies Co., Ltd., Shenzhen (CN)

(72) Inventors: Bo Wang, Shenzhen (CN); Li Li, Shenzhen (CN); Xitao Dai, Shenzhen (CN); Lihua Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/081,589

(22) Filed: Nov. 15, 2013

(65) Prior Publication Data

US 2014/0187254 A1 Jul. 3, 2014

Related U.S. Application Data (63) Continuation of application No. PCT/CN2013/071297, filed on Feb. 2, 2013.

(30) Foreign Application Priority Data

Dec. 28, 2012 (CN) .......................... 2012 1 0584008

(51) Int. Cl.
*H04W 72/00* (2009.01)
*H04W 24/04* (2009.01)
*H04W 24/08* (2009.01)
*H04W 88/08* (2009.01)

(52) U.S. Cl.
CPC .............. *H04W 24/04* (2013.01); *H04W 24/08* (2013.01); *H04W 88/085* (2013.01)

(58) Field of Classification Search
CPC . H04W 84/12; H04W 36/0055; H04W 36/08; H04W 36/30; H04W 36/0083; H04W 48/20; H04W 36/04; H04W 36/14; H04W 48/18; H04W 84/045; H04W 88/08; H04W 92/20; H04W 36/00; H04W 36/0061; H04W 36/009
USPC ....................................................... 455/452.1
See application file for complete search history.

(56) References Cited

U.S. PATENT DOCUMENTS

| | | | |
|---|---|---|---|
| 2010/0130210 A1* | 5/2010 | Tokgoz et al. | ................ 455/437 |
| 2010/0304665 A1 | 12/2010 | Higuchi | |
| 2013/0109402 A1 | 5/2013 | Zhou et al. | |

FOREIGN PATENT DOCUMENTS

| | | | |
|---|---|---|---|
| CN | 101982995 | A | 3/2011 |
| CN | 102104445 | A | 6/2011 |
| CN | 102387488 | A | 3/2012 |
| CN | 102387489 | A | 3/2012 |
| CN | 102388645 | A | 3/2012 |
| CN | 102595625 | A | 7/2012 |
| EP | 2621221 | A1 | 7/2013 |
| WO | 2011016174 | A1 | 10/2011 |

OTHER PUBLICATIONS

International Search Report and Written Opinion received in Application No. PCT/CN2013/071297 mailed Sep. 12, 2013, 12 pages.

* cited by examiner

*Primary Examiner* — Kwasi Karikari
(74) *Attorney, Agent, or Firm* — Slater & Matsil, L.L.P.

(57) ABSTRACT

The present invention provides a method for selecting a working remote radio unit for a user equipment. By comparing isolation of a current working RRU set of a user equipment with a preset isolation threshold, resource utilization and signal interference can be effectively balanced and a working remote radio unit of the user equipment can be accurately determined.

20 Claims, 6 Drawing Sheets

METHOD AND BASE STATION FOR SELECTING WORKING REMOTE RADIO UNIT FOR USER EQUIPMENT

This application is a continuation of International Application No. PCT/CN2013/071297, filed on Feb. 2, 2013, which claims priority to Chinese Patent Application No. 201210584008.8, filed on Dec. 28, 2012, both of which are hereby incorporated herein by reference in their entireties.

TECHNICAL FIELD

The present invention relates to the field of wireless communications technologies, and in particular, to a method and a base station for selecting a working remote radio unit for a user equipment.

BACKGROUND

At present, long term evolution (LTE) systems generally adopt intra-frequency networking, and have severe co-channel interference. In practice, a macro diversity gain is obtained by using a method in which multiple RRUs are used to work for one user equipment, for example, multicast or a multi-remote radio unit (RRU) cell, so as to reduce the interference.

When multiple RRUs are used to work for one user equipment, if all RRUs in a cell work for the user equipment, resource utilization is rather low. Therefore, it is necessary to select several effective RRUs to work for the user equipment, that is, select a working RRU for the user equipment. In the prior art, there are mainly two methods for selecting a working RRU for a user equipment. A first method is that, according to reference signal receiving powers (RSRPs) of the user equipment received by all RRUs in a cell, RSRPs are sorted in descending order, and RRUs corresponding to the first N RSRPs are selected as working RRUs of the user equipment. A second method is that, according to RSRPs of the user equipment received by all RRUs in a cell, the RSRPs are sorted in descending order, and RRUs corresponding to N RSRPs, differences between which and a first RSRP are within a certain threshold, are selected as working RRUs of the user equipment. The foregoing two methods in the prior art both cannot achieve a good balance between resource utilization and interference cancellation, and cannot accurately determine a working RRU of a user equipment.

SUMMARY OF THE INVENTION

To solve the foregoing problem in the prior art, in a first aspect, the present invention provides a method for selecting a working remote radio unit RRU for a user equipment, including sorting, by a base station, measurement information values of all RRUs in a cell for a user equipment, and determining an initial RRU set of the user equipment, sequentially calculating, by the base station, isolation of a current RRU set of the user equipment starting from the initial RRU set according to the measurement information values in the sorted order, and sequentially determining, by the base station according to whether the isolation of the current RRU set of the user equipment satisfies a preset isolation threshold, whether RRUs corresponding to the measurement information values in the sorted order are working RRUs of the user equipment.

With reference to the first aspect, in a first possible implementation manner, the sorting is sorting in descending order, the RRU set is a working RRU set, and the initial RRU set is an initial working RRU set, the determining, by the base station, an initial RRU set of the user equipment includes using, by the base station, an RRU corresponding to a greatest measurement information value as the initial working RRU set of the user equipment, and the sequentially determining, by the base station according to whether the isolation of the current RRU set of the user equipment satisfies a preset isolation threshold, whether RRUs corresponding to the measurement information values in the sorted order are working RRUs of the user equipment includes, if isolation of a current working RRU set of the user equipment is smaller than, or smaller than or equal to the preset isolation threshold, combining, by the base station, an RRU corresponding to a next measurement information value in the sorted order into the current working RRU set of the user equipment, and continuing to calculate isolation of a current working RRU set of the user equipment, and if the isolation of the current working RRU set of the user equipment is greater than or equal to, or greater than the preset isolation threshold, or when an RRU corresponding to a last measurement information value in the sorted order is combined into the current working RRU set of the user equipment, stopping, by the base station, verification.

With reference to the first aspect, in a second possible implementation manner, the sorting is sorting in ascending order, the RRU set is a working RRU set, and the initial RRU set is an initial working RRU set, the determining, by the base station, an initial RRU set of the user equipment includes using, by the base station, a set of all the RRUs in the cell as the initial working RRU set of the user equipment, and the sequentially determining, by the base station according to whether the isolation of the current RRU set of the user equipment satisfies a preset isolation threshold, whether RRUs corresponding to the measurement information values in the sorted order are working RRUs of the user equipment includes, if isolation of a current working RRU set of the user equipment is greater than, or greater than or equal to the preset isolation threshold, removing, by the base station, an RRU corresponding to a smallest measurement information value in the current working RRU set of the user equipment from the current working RRU set of the user equipment, and continuing to calculate isolation of a current working RRU set of the user equipment, and if the isolation of the current working RRU set of the user equipment is smaller than or equal to, or smaller than the preset isolation threshold, or when only an RRU corresponding to a last measurement information value in the sorted order is left in the current working RRU set of the user equipment, stopping, by the base station, verification.

With reference to the first aspect, in a third possible implementation manner, the sorting is sorting in ascending order, the RRU set is a non-working RRU set, and the initial RRU set is an initial non-working RRU set, the determining, by the base station, an initial RRU set of the user equipment includes using, by the base station, a null set as an initial non-working RRU set of the user equipment, and the sequentially determining, by the base station according to whether the isolation of the current RRU set of the user equipment satisfies a preset isolation threshold, whether RRUs corresponding to the measurement information values in the sorted order are working RRUs of the user equipment includes, if isolation of a current non-working RRU set of the user equipment is greater than, or greater than or equal to the preset isolation threshold, combining, by the base station, an RRU corresponding to a next measurement information value in the sorted order into the current non-working RRU set of the user equipment, and continuing to calculate isolation of a current non-working RRU set of the user equipment, and if the isolation of the current non-working RRU set of the user equipment is smaller than or equal to, or smaller than the preset isolation threshold, or when an RRU corresponding to a next-to-last measurement information value in the sorted order is combined into the current non-working RRU set of the user equipment, stopping, by the base station, verification, and calculating, by the base station, a complementary set of the non-working RRU set of the user equipment to obtain a working RRU set of the user equipment.

With reference to the first aspect, in a fourth possible implementation manner, the sorting is sorting in descending order, the RRU set is a non-working RRU set, and the initial RRU set is an initial non-working RRU set, the determining, by the base station, an initial RRU set of the user equipment includes using, by the base station, a set of all the RRUs in the cell other than an RRU corresponding to a greatest measurement information value as an initial non-working RRU set of the user equipment, and the sequentially determining, by the base station according to whether the isolation of the current RRU set of the user equipment satisfies a preset isolation threshold, whether RRUs corresponding to the measurement information values in the sorted order are working RRUs of the user equipment includes, if isolation of a current non-working RRU set of the user equipment is smaller than, or smaller than or equal to the preset isolation threshold, removing, by the base station, an RRU corresponding to a greatest measurement information value in the current non-working RRU set of the user equipment from the current non-working RRU set of the user equipment, and continuing to calculate isolation of a current non-working RRU set of the user equipment, and if the isolation of the current non-working RRU set of the user equipment is greater than or equal to, or greater than the preset isolation threshold, or when only an RRU corresponding to a last measurement information value in the sorted order is left in the current non-working RRU set of the user equipment, stopping, by the base station, verification, and calculating, by the base station, a complementary set of the non-working RRU set of the user equipment to obtain a working RRU set of the user equipment.

With reference to the first aspect and the first to fourth possible implementation manners in the first aspect, in a fifth possible implementation manner, the measurement information value is one or a combination of the following parameters: a reference signal receiving power RSRP and a signal to interference plus noise ratio SINR.

With reference to the first aspect and the first to fourth possible implementation manners in the first aspect, in a sixth possible implementation manner, a method for calculating the isolation is expressed as:

$g = f$(measurement information value (0), measurement information value (1), ..., measurement information value ($m$))−(measurement information value ($m$+1), measurement information value ($m$+2), ..., measurement information value ($N$−1)), where g is the isolation of the current RRU set of the user equipment, N is the number of all the RRUs in the cell, f is a method function for converting a combined value of measurement information values into an equivalent measurement value, and the current RRU set of the user equipment is the first m+1 RRUs in the sorted order.

With reference to the first aspect and the first to fourth possible implementation manners in the first aspect, in a seventh possible implementation manner, the measurement information value is a reference signal receiving power RSRP, and a method for calculating the isolation is expressed as:

$$g = 10\log\left(\sum_{k=0}^{m} 10^{\frac{RSRP_k}{10}}\right) - 10\log\left(\sum_{k=m+1}^{N-1} 10^{\frac{RSRP_k}{10}}\right)$$

$$= 10\log\left(\frac{\sum_{k=0}^{m} 10^{\frac{RSRP_k}{10}}}{\sum_{k=m+1}^{N-1} 10^{\frac{RSRP_k}{10}}}\right),$$

where g is the isolation of the current RRU set of the user equipment, N is the number of all the RRUs in the cell, k is a number of an RRU in the sorted order, $RSRP_k$ is an RSRP value of an RRU numbered with k, and the current RRU set of the user equipment is the first m+1 RRUs in the sorted order.

In a second aspect, the present invention provides a base station, configured to select a working remote radio unit RRU for a user equipment and including a processing module, configured to sort measurement information values of all RRUs in a cell for a user equipment, an initialization module, configured to determine an initial RRU set of the user equipment, a verification module, configured to sequentially calculate isolation of a current RRU set of the user equipment starting from the initial RRU set according to the measurement information values in the sorted order, and a selection module, configured to sequentially determine, according to whether the isolation of the current RRU set of the user equipment satisfies a preset isolation threshold, whether RRUs corresponding to the measurement information values in the sorted order are working RRUs of the user equipment.

With reference to the second aspect, in a first possible implementation manner, the sorting is sorting in descending order, the RRU set is a working RRU set, and the initial RRU set is an initial working RRU set, the initialization module is specifically configured to use an RRU corresponding to a greatest measurement information value as the initial working RRU set of the user equipment, and the selection module is specifically configured to, if isolation of a current working RRU set of the user equipment is smaller than, or smaller than or equal to the preset isolation threshold, combine an RRU corresponding to a next measurement information value in the sorted order into the current working RRU set of the user equipment, and continue to calculate isolation of a current working RRU set of the user equipment, and if the isolation of the current working RRU set of the user equipment is greater than or equal to, or greater than the preset isolation threshold, or when an RRU corresponding to a last measurement information value in the sorted order is combined into the current working RRU set of the user equipment, stop verification.

With reference to the second aspect, in a second possible implementation manner, the sorting is sorting in ascending order, the RRU set is a working RRU set, and the initial RRU set is an initial working RRU set, the initialization module is specifically configured to use a set of all the RRUs in the cell as the initial working RRU set of the user equipment, and the selection module is specifically configured to, if isolation of a current working RRU set of the user equipment is greater than, or greater than or equal to the preset isolation threshold, remove an RRU corresponding to a smallest measurement information value in the current working RRU set of the user equipment from the current working RRU set of the user equipment, and continue to calculate isolation of a current working RRU set of the user equipment, and if the isolation of the current working RRU set of the user equipment is smaller than or equal to, or smaller than the preset isolation threshold, or when only an RRU corresponding to a last measurement information value in the sorted order is left in the current working RRU set of the user equipment, stop verification.

With reference to the second aspect, in a third possible implementation manner, the sorting is sorting in ascending order, the RRU set is a non-working RRU set, and the initial RRU set is an initial non-working RRU set, the initialization module is specifically configured to use a null set as an initial non-working RRU set of the user equipment, and the selection module is specifically configured to, if isolation of a current non-working RRU set of the user equipment is greater than, or greater than or equal to the preset isolation threshold, combine an RRU corresponding to a next measurement information value in the sorted order into the current non-working RRU set of the user equipment, and continue to calculate isolation of a current non-working RRU set of the user equipment, and if the isolation of the current non-working RRU set of the user equipment is smaller than or equal to, or smaller than the preset isolation threshold, or when an RRU corresponding to a next-to-last measurement information value in the sorted order is combined into the current non-working RRU set of the user equipment, stop verification, and the base station further includes a calculation module, configured to calculate a complementary set of the non-working RRU set of the user equipment to obtain a working RRU set of the user equipment.

With reference to the second aspect, in a fourth possible implementation manner, the sorting is sorting in descending order, the RRU set is a non-working RRU set, and the initial RRU set is an initial non-working RRU set, the initialization module is specifically configured to use a set of all the RRUs in the cell other than an RRU corresponding to a greatest measurement information value as an initial non-working RRU set of the user equipment, and the selection module is specifically configured to, if isolation of a current non-working RRU set of the user equipment is smaller than, or smaller than or equal to the preset isolation threshold, remove an RRU corresponding to a greatest measurement information value in the current non-working RRU set of the user equipment from the current non-working RRU set of the user equipment, and continue to calculate isolation of a current non-working RRU set of the user equipment, and if the isolation of the current non-working RRU set of the user equipment is greater than or equal to, or greater than the preset isolation threshold, or when only an RRU corresponding to a last measurement information value in the sorted order is left in the current non-working RRU set of the user equipment, stop verification, and the base station further includes a calculation module, configured to calculate a complementary set of the non-working RRU set of the user equipment to obtain a working RRU set of the user equipment.

With reference to the second aspect and the first to fourth possible implementation manners in the second aspect, in a fifth possible implementation manner, the measurement information value is one or a combination of the following parameters: a reference signal receiving power RSRP and a signal to interference plus noise ratio SINR.

With reference to the second aspect and the first to fourth possible implementation manners in the second aspect, in a sixth possible implementation manner, a method for calculating the isolation is expressed as:

$$g = f(\text{measurement information value } (0), \text{measurement information value } (1), \ldots, \text{measurement information value } (m)) - f(\text{measurement information value } (m+1), \text{measurement information value } (m+2), \ldots, \text{measurement information value } (N-1)),$$

where g is the isolation of the current RRU set of the user equipment, N is the number of all the RRUs in the cell, f is a method function for converting a combined value of measurement information values into an equivalent measurement value, and the current RRU set of the user equipment is the first m+1 RRUs in the sorted order.

With reference to the second aspect and the first to fourth possible implementation manners in the second aspect, in a seventh possible implementation manner, the measurement information value is a reference signal receiving power RSRP, and a method for calculating the isolation is expressed as:

$$g = 10\log\left(\sum_{k=0}^{m} 10^{\frac{RSRP_k}{10}}\right) - 10\log\left(\sum_{k=m+1}^{N-1} 10^{\frac{RSRP_k}{10}}\right)$$

$$= 10\log\left(\frac{\sum_{k=0}^{m} 10^{\frac{RSRP_k}{10}}}{\sum_{k=m+1}^{N-1} 10^{\frac{RSRP_k}{10}}}\right),$$

where g is the isolation of the current RRU set of the user equipment, N is the number of all the RRUs in the cell, k is a number of an RRU in the sorted order, $RSRP_k$ is an RSRP value of an RRU numbered with k, and the current RRU set of the user equipment is the first m+1 RRUs in the sorted order.

In the present invention, by comparing isolation of a current working RRU set of a user equipment with a preset isolation threshold, resource utilization and signal interference can be effectively balanced and a working remote radio unit of the user equipment can be accurately determined.

BRIEF DESCRIPTION OF THE DRAWINGS

To describe the technical solutions in the embodiments of the present invention more clearly, the accompanying drawings required for describing the embodiments of the present invention are introduced briefly in the following. Apparently, the accompanying drawings in the following description show only some embodiments of the present invention, and persons of ordinary skill in the art can also derive other drawings from these accompanying drawings without creative efforts.

DETAILED DESCRIPTION OF ILLUSTRATIVE EMBODIMENTS

The technical solutions in the embodiments of the present invention are clearly and fully described in the following with reference to the accompanying drawings in the embodiments of the present invention. Apparently, the embodiments to be described are only a part of rather than all of the embodiments of the present invention. All other embodiments obtained by persons of ordinary skill in the art based on the embodiments of the present invention without creative efforts shall fall within the protection scope of the present invention.

The present invention provides a method for selecting a working RRU for a user equipment, including sorting, by a base station, measurement information values of all RRUs in a cell for a user equipment, and determining an initial RRU set of the user equipment, sequentially calculating, by the base station, isolation of a current RRU set of the user equipment starting from the initial RRU set according to the measurement information values in the sorted order, and sequentially determining, by the base station according to whether the isolation of the current RRU set of the user equipment satisfies a preset isolation threshold, whether RRUs corresponding to the measurement information values in the sorted order are working RRUs of the user equipment.

In the present invention, by selecting a working RRU for a user equipment in an isolation calculation manner, resource utilization and signal interference can be effectively balanced and a working RRU set of the user equipment can be accurately determined. The technical solutions of the present invention are described in the following through specific embodiments.

Embodiment 1

Figure 1:
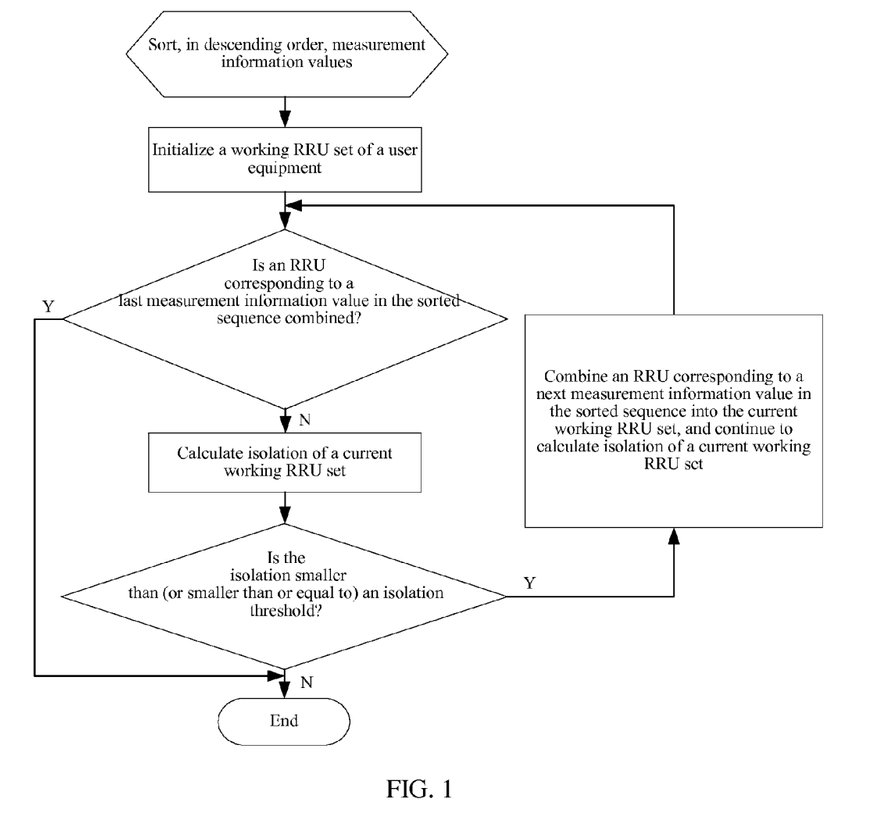
FIG. 1 is a schematic flowchart of a method for selecting a working RRU set for a user equipment according to an embodiment of the present invention.

FIG. 1 is a flowchart of a method for selecting a working RRU set for a user equipment according to an embodiment of the present invention. As shown in FIG. 1, the method according to this embodiment includes the following.

Step 101: A base station sorts, in descending order, measurement information values of all RRUs in a cell for a user equipment.

The cell may be a single frequency network (SFN) cell, and may also be a communication cell commonly understood by persons skilled in the art. The measurement information value may be an RSRP, may also be a signal to interference plus noise ratio (SINR), and may also be an RSRP satisfying a certain SINR condition. In this embodiment, that the measurement information value is an RSRP is taken as an example for description. All the RRUs in the cell each have an RSRP measurement value for a signal of the user equipment, and the base station sorts these obtained RSRPs in descending order.

Step 102: The base station uses an RRU corresponding to a greatest measurement information value as an initial working RRU set of the user equipment.

That is, in this embodiment, at the beginning, a working RRU set of the user equipment includes only an RRU corresponding to a greatest RSRP, which is based on a practical situation where at least one RRU works for the user equipment.

Step 103: The base station sequentially calculates isolation of a current working RRU set of the user equipment starting from the initial RRU set according to the measurement information values in the sorted order.

The isolation refers to a difference between an equivalent measurement value obtained by converting a combined value of measurement information values of RRUs in the current working RRU set of the user equipment and an equivalent measurement value obtained by converting a combined value of measurement information values of RRUs outside the current working RRU set of the user equipment. A purpose of calculating the isolation is to measure a signal strength difference between an RRU working for the user equipment and another RRU. If the difference does not exceed a certain threshold, it indicates that signal interference from the another RRU is strong at this time, and it needs to select the another RRU as a working RRU, and if the difference exceeds a certain threshold, it indicates that signal interference from the another RRU is weak, and it does not need to select the another RRU as a working RRU.

In this embodiment, a method for calculating the isolation g may be expressed as:

$g$=equivalent measurement value obtained by converting a combined value of measurement information values of RRUs in the current working RRU set−equivalent measurement value obtained by converting a combined value of measurement information values of RRUs outside the current working RRU set; and further, the method for calculating the isolation g may be expressed as:

$g = f$(measurement information value (0), measurement information value (1), . . . , measurement information value ($m$))−$f$(measurement information value ($m$+1), measurement information value ($m$+2), . . . , measurement information value ($N$−1)), where g is the isolation, N is the number of all the RRUs in the cell, f is a method function for converting a combined value of measurement information values into an equivalent measurement value, and the isolation that is calculated currently is isolation when the working RRU set of the user equipment is the first m+1 RRUs in the sorted descending sequence.

Further, by taking that the measurement information value is an RSRP as an example, a formula for calculating the isolation may be:

$$g = 10\log\left(\sum_{k=0}^{m} 10^{\frac{RSRP_k}{10}}\right) - 10\log\left(\sum_{k=m+1}^{N-1} 10^{\frac{RSRP_k}{10}}\right)$$

$$= 10\log\left(\frac{\sum_{k=0}^{m} 10^{\frac{RSRP_k}{10}}}{\sum_{k=m+1}^{N-1} 10^{\frac{RSRP_k}{10}}}\right),$$

where g is the isolation of the current RRU set of the user equipment, N is the number of all the RRUs in the cell, k is a number of an RRU in the sorted order, $RSRP_k$ is an RSRP value of an RRU numbered with k, and the current RRU set of the user equipment is the first m+1 RRUs in the sorted order.

Step 104: If the isolation of the current working RRU set is smaller than a preset isolation threshold, the base station combines an RRU corresponding to a next measurement information value in the sorted order into the current working RRU set of the user equipment.

For example, there are 5 RRUs in the cell in total, measurement information values for the user equipment are sorted in descending order, 5, 4, 3, 2, 1, and the current working RRU set of the user equipment is (5). If the isolation of the current working RRU set is smaller than a preset isolation threshold, an RRU corresponding to a next measurement information value in the sorted order, that is, 4, is combined into the current working RRU set of the user equipment.

If the isolation of the current working RRU set of the user equipment is greater than the preset isolation threshold, or when an RRU corresponding to a last measurement information value in the sorted order is combined into the current working RRU set of the user equipment the base station stops verification. In the foregoing example, when the last measurement information value 1 in the sorted order is combined into the working set, the base station stops verification.

If the isolation of the current working RRU set is equal to the preset isolation threshold, the base station may either combine the RRU corresponding to the next measurement information value in the sorted order into the working RRU set, or stop verification.

The isolation threshold may be set to, for example, 10 dB, according to a practical situation.

Step 105: The base station repeatedly performs step 103 to step 104, until calculated isolation is greater than or equal to the preset isolation threshold.

In this embodiment, by comparing isolation of a current working RRU set of a user equipment with a preset isolation threshold, and combining an RRU satisfying the preset isolation threshold into the current working RRU set of the user equipment, resource utilization and signal interference can be effectively balanced and a working RRU set of the user equipment can be accurately determined.

Embodiment 2

Figure 2:
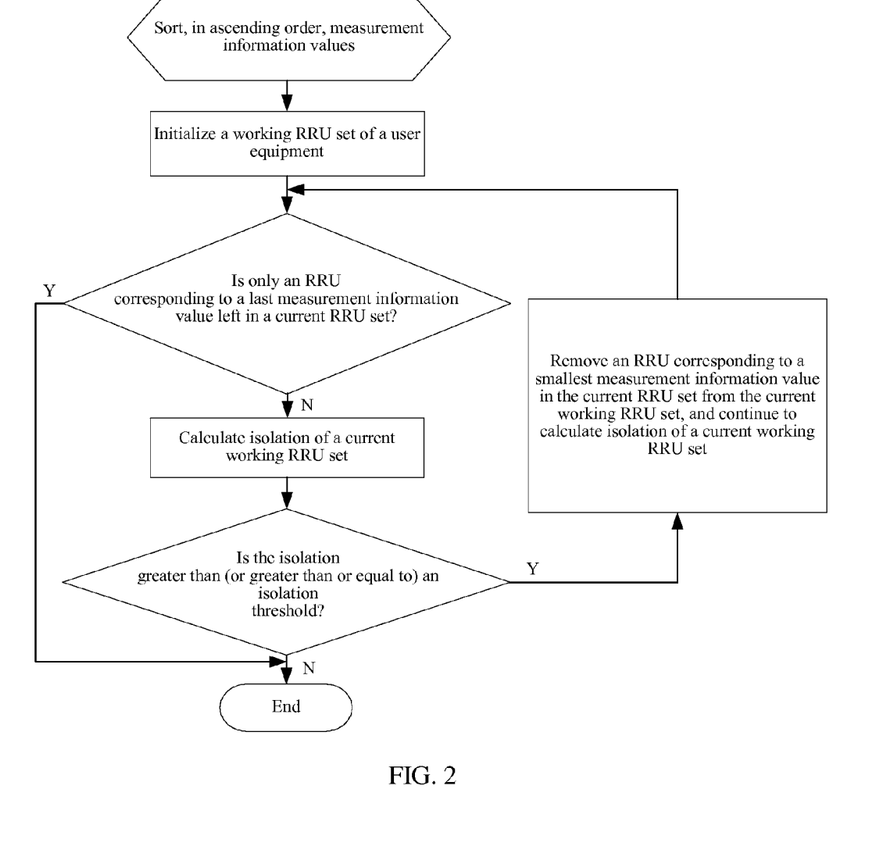
FIG. 2 is a schematic flowchart of another method for selecting a working RRU set for a user equipment according to an embodiment of the present invention.

FIG. 2 is a flowchart of another method for selecting a working RRU set for a user equipment according to an embodiment of the present invention. As shown in FIG. 2, the method according to this embodiment includes the following.

Step 201: A base station sorts, in ascending order, measurement information values of all RRUs in a cell for a user equipment.

This step is approximately the same as step 101, and a difference lies in that the measurement information values for the user equipment are sorted in different orders.

Step 202: The base station uses all the RRUs in the cell as an initial working RRU set of the user equipment.

That is, in this embodiment, at the beginning, a working RRU set of the user equipment includes all the RRUs in the cell.

Step 203: The base station calculates isolation of a current working RRU set of the user equipment starting from the initial working RRU set according to the measurement information values in the sorted order.

This step is approximately the same as step 103, and a difference lies in that the base station calculates the isolation in different orders.

In this embodiment, a method for calculating the isolation g may be expressed as:

g=equivalent measurement value obtained by converting a combined value of measurement information values of RRUs in the current working RRU set−equivalent measurement value obtained by converting a combined value of measurement information values of RRUs outside the current working RRU set; and further, the method for calculating the isolation g may be expressed as:

g=f(measurement information value (0), measurement information value (1), . . . , measurement information value (m))−f(measurement information value (m+1), measurement information value (m+2), . . . , measurement information value (N−1)), where g is the isolation, N is the number of all the RRUs in the cell, f is a method function for converting a combined value of measurement information values into an equivalent measurement value, and the isolation that is calculated currently is isolation when the working RRU set of the user equipment is the first m+1 RRUs in the sorted ascending sequence.

Further, by taking that the measurement information value is an RSRP as an example, a formula for calculating the isolation may be:

$$g = 10\log\left(\sum_{k=0}^{m} 10^{\frac{RSRP_k}{10}}\right) - 10\log\left(\sum_{k=m+1}^{N-1} 10^{\frac{RSRP_k}{10}}\right)$$

$$= 10\log\left(\frac{\sum_{k=0}^{m} 10^{\frac{RSRP_k}{10}}}{\sum_{k=m+1}^{N-1} 10^{\frac{RSRP_k}{10}}}\right),$$

where g is the isolation of the current RRU set of the user equipment, N is the number of all the RRUs in the cell, k is a number of an RRU in the sorted order, $RSRP_k$ is an RSRP value of an RRU numbered with k, and the current RRU set of the user equipment is the first m+1 RRUs in the sorted order.

Step 204: If the isolation of the current working RRU set is greater than a preset isolation threshold, the base station removes an RRU corresponding to a smallest measurement information value in the current working RRU set of the user equipment from the current working RRU set of the user equipment.

If the isolation of the current working RRU set is smaller than the preset isolation threshold, or when only an RRU corresponding to a last measurement information value in the sorted order is left in the current working RRU set of the user equipment, the base station stops verification. If the isolation is equal to the preset isolation threshold, the base station may either remove the RRU corresponding to the smallest measurement information value in the current working RRU set of the user equipment from the current working RRU set of the user equipment, or stop verification.

The isolation threshold may be set to, for example, 10 dB, according to a practical situation.

Step 205: The base station repeatedly performs step 203 to step 204, until calculated isolation is smaller than or equal to the preset isolation threshold.

In this embodiment, by comparing isolation of a current working RRU set of a user equipment with a preset isolation threshold, and removing an RRU satisfying the preset isolation threshold from the current working RRU set of the user equipment, resource utilization and signal interference can be effectively balanced and a working RRU set of the user equipment can be accurately determined.

Embodiment 3

Figure 3:
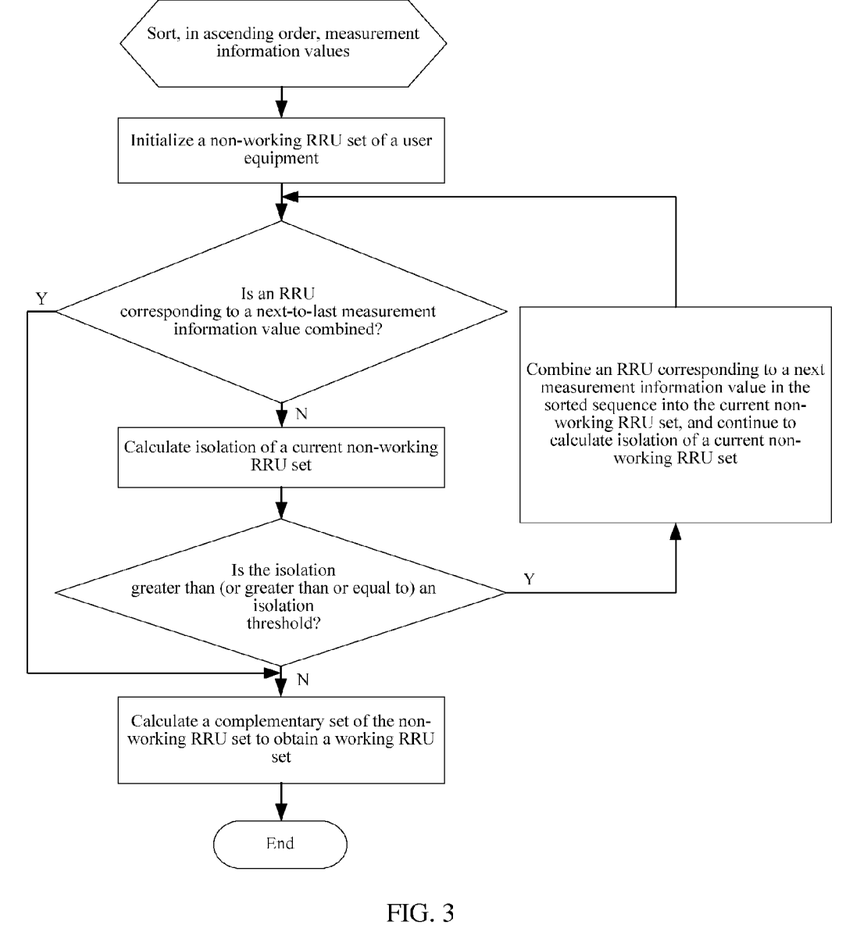
FIG. 3 is a schematic flowchart of another method for selecting a working RRU set for a user equipment according to an embodiment of the present invention.

FIG. 3 is a flowchart of another method for selecting a working RRU set for a user equipment according to an embodiment of the present invention. As shown in FIG. 3, this embodiment is different from Embodiments 1 and 2 in that, in this embodiment, a non-working RRU set of a user equipment is obtained first, and then a working RRU set is obtained by calculating a complementary set of the non-working RRU set. The method includes the following.

Step 301: A base station sorts, in ascending order, measurement information values of all RRUs in a cell for a user equipment.

This step is approximately the same as step 101, and a difference lies in that the measurement information values for the user equipment are sorted in different orders.

Step 302: The base station uses a null set as an initial non-working RRU set of the user equipment.

That is, in this embodiment, at the beginning, a non-working RRU set of the user equipment includes no RRU.

Step 303: The base station calculates isolation of a current non-working RRU set of the user equipment starting from the initial non-working RRU set according to the measurement information values in the sorted order.

A method for calculating the isolation in this step is the same as that in step 103, and a difference lies in that the base station calculates the isolation in ascending order, and the isolation that is calculated is the isolation of the current non-working RRU set.

In this embodiment, a method for calculating the isolation g may be expressed as:

g=equivalent measurement value obtained by converting a combined value of measurement information values of RRUs in the current non-working RRU set−equivalent measurement value obtained by converting a combined value of measurement information values of RRUs outside the current non-working RRU set; and further, the method for calculating the isolation g may be expressed as:

g=f(measurement information value (0), measurement information value (1), . . . , measurement information value (m))−f(measurement information value (m+1), measurement information value (m+2), . . . , measurement information value (N−1)), where g is the isolation, N is the number of all the RRUs in the cell, f is a method function for converting a combined value of measurement information values into an equivalent measurement value, and the isolation that is calculated currently is isolation when the non-working RRU set of the user equipment is the first m+1 RRUs in the sorted ascending sequence.

Further, by taking that the measurement information value is an RSRP as an example, a formula for calculating the isolation may be:

$$g = 10\log\left(\sum_{k=0}^{m} 10^{\frac{RSRP_k}{10}}\right) - 10\log\left(\sum_{k=m+1}^{N-1} 10^{\frac{RSRP_k}{10}}\right)$$

$$= 10\log\left(\frac{\sum_{k=0}^{m} 10^{\frac{RSRP_k}{10}}}{\sum_{k=m+1}^{N-1} 10^{\frac{RSRP_k}{10}}}\right),$$

where g is the isolation of the current RRU set of the user equipment, N is the number of all the RRUs in the cell, k is a number of an RRU in the sorted order, $RSRP_k$ is an RSRP value of an RRU numbered with k, and the current RRU set of the user equipment is the first m+1 RRUs in the sorted order.

Step 304: If the isolation of the current non-working RRU set is greater than a preset isolation threshold, the base station combines an RRU corresponding to a next measurement information value in the sorted order into the current non-working RRU set.

If the isolation of the current non-working RRU set is smaller than the preset isolation threshold, or when an RRU corresponding to a next-to-last measurement information value in the sorted order is combined into the current non-working RRU set of the user equipment, the base station stops verification. If the isolation of the current non-working RRU set is equal to the preset isolation threshold, the base station may either combine the RRU corresponding to the next measurement information value in the sorted order into the current non-working RRU set, or stop verification.

Step 305: The base station repeatedly performs step 303 to step 304, until calculated isolation is smaller than or equal to the preset isolation threshold Step 306: After obtaining a non-working RRU set of the user equipment, the base station obtains a working RRU set of the user equipment by calculating a complementary set of the non-working RRU set.

In this embodiment, by comparing isolation of a current non-working RRU set of a user equipment with a preset isolation threshold, combining an RRU satisfying the preset isolation threshold into the current non-working RRU set of the user equipment, and calculating a complementary set of the non-working set to obtain a working RRU set of the user equipment, resource utilization and signal interference can be effectively balanced and a working RRU set of the user equipment can be accurately determined.

Embodiment 4

Figure 4:
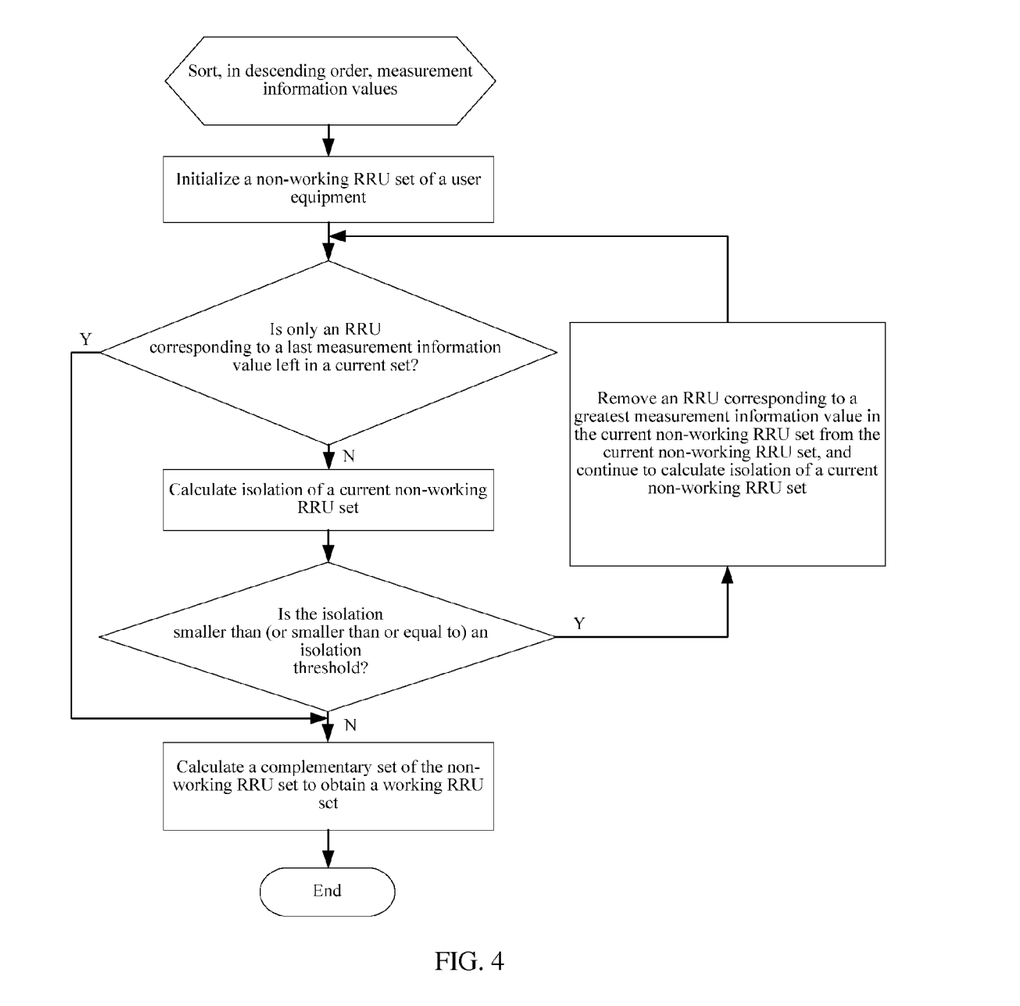
FIG. 4 is a schematic flowchart of another method for selecting a working RRU set for a user equipment according to an embodiment of the present invention.

FIG. 4 is a flowchart of another method for selecting a working RRU set for a user equipment according to an embodiment of the present invention. As shown in FIG. 4, this embodiment is different from Embodiments 1 and 2 in that, in this embodiment, a non-working RRU set of a user equipment is obtained first, and then a working RRU set is obtained by calculating a complementary set of the non-working RRU set. The method includes the following.

Step 401: A base station sorts, in descending order, measurement information values of all RRUs in a cell for a user equipment.

This step is the same as step 101.

Step 402: The base station uses a set of all the RRUs in the cell other than an RRU corresponding to a greatest measurement information value as an initial non-working RRU set of the user equipment.

That is, in this embodiment, at the beginning, a non-working RRU set of the user equipment includes all the RRUs in the cell other than the RRU corresponding to the greatest measurement information value.

Step 403: The base station calculates isolation of a current non-working RRU set of the user equipment starting from the initial non-working RRU set according to the measurement information values in the sorted order.

A method for calculating the isolation in this step is the same as that in step 103, and a difference lies in that the isolation that is calculated by the base station is the isolation of the current non-working RRU set.

In this embodiment, a method for calculating the isolation g may be expressed as:

g=equivalent measurement value obtained by converting a combined value of measurement information values of RRUs in the current non-working RRU set−equivalent measurement value obtained by converting a combined value of measurement information values of RRUs outside the current non-working RRU set; and further, the method for calculating the isolation g may be expressed as:

g=f(measurement information value (0), measurement information value (1), . . . , measurement information value (m))−f(measurement information value (m+1), measurement information value (m+2), . . . , measurement information value (N−1)), where g is the isolation, N is the number of all the RRUs in the cell, f is a method function for converting a combined value of measurement information values into an equivalent measurement value, and the isolation that is calculated currently is isolation when the non-working RRU set of the user equipment is the first m+1 RRUs in the sorted descending sequence.

Further, by taking that the measurement information value is an RSRP as an example, a formula for calculating the isolation may be:

$$g = 10\log\left(\sum_{k=0}^{m} 10^{\frac{RSRP_k}{10}}\right) - 10\log\left(\sum_{k=m+1}^{N-1} 10^{\frac{RSRP_k}{10}}\right)$$

$$= 10\log\left(\frac{\sum_{k=0}^{m} 10^{\frac{RSRP_k}{10}}}{\sum_{k=m+1}^{N-1} 10^{\frac{RSRP_k}{10}}}\right),$$

where g is the isolation of the current RRU set of the user equipment, N is the number of all the RRUs in the cell, k is a number of an RRU in the sorted order, $RSRP_k$ is an RSRP value of an RRU numbered with k, and the current RRU set of the user equipment is the first m+1 RRUs in the sorted order.

Step 404: If the isolation of the current non-working RRU set is smaller than a preset isolation threshold, the base station removes an RRU corresponding to a greatest measurement information value in the current non-working RRU set of the user equipment from the current non-working RRU set of the user equipment.

If the isolation of the current non-working RRU set is greater than the preset isolation threshold, or when only an RRU corresponding to a last measurement information value in the sorted order is left in the current non-working RRU set of the user equipment, the base station stops verification. If the isolation of the current non-working RRU set is equal to the preset isolation threshold, the base station may either remove the RRU corresponding to the greatest measurement information value in the current non-working RRU set of the user equipment from the current non-working RRU set of the user equipment, or stop verification.

The isolation threshold may be set to, for example, 10 dB, according to a practical situation.

Step 405: The base station repeatedly performs step 403 to step 404, until calculated isolation is greater than or equal to the preset isolation threshold.

Step 406: After obtaining a non-working RRU set of the user equipment, the base station obtains a working RRU set of the user equipment by calculating a complementary set of the non-working RRU set.

In this embodiment, by comparing isolation of a current non-working RRU set of a user equipment with a preset isolation threshold, removing an RRU satisfying the preset isolation threshold from the current non-working RRU set of the user equipment, and calculating a complementary set of the non-working set to obtain a working RRU set of the user equipment, resource utilization and signal interference can be effectively balanced and a working RRU set of the user equipment can be accurately determined.

Embodiment 5

Figure 5A:
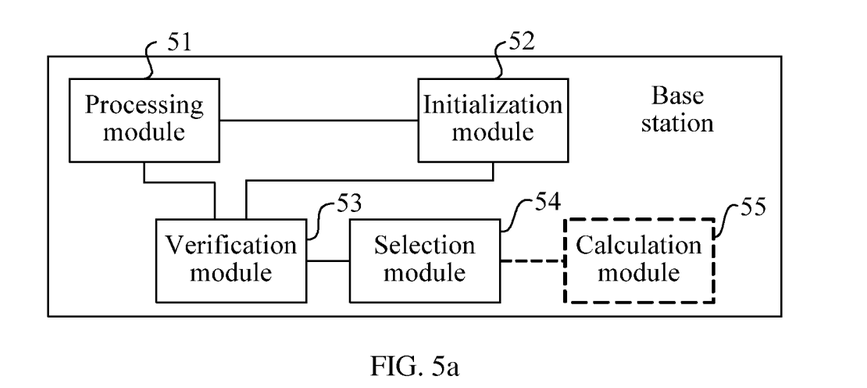
FIG. 5a is a schematic structural diagram of a base station according to an embodiment of the present invention.

FIG. 5*a* shows a base station for selecting a working RRU for a user equipment according to an embodiment of the present invention. As shown in the figure, the base station includes a processing module 51, configured to sort measurement information values of all RRUs in a cell for a user equipment, an initialization module 52, configured to determine an initial RRU set of the user equipment, a verification module 53, configured to sequentially calculate isolation of a current RRU set of the user equipment starting from the initial RRU set according to the measurement information values in the sorted order, and a selection module 54, configured to sequentially determine, according to whether the isolation of the current RRU set of the user equipment satisfies a preset isolation threshold, whether RRUs corresponding to the measurement information values in the sorted order are working RRUs of the user equipment.

This embodiment further includes the sorting is sorting in descending order, the RRU set is a working RRU set, and the initial RRU set is an initial working RRU set, the initialization module is specifically configured to: use an RRU corresponding to a greatest measurement information value as the initial working RRU set of the user equipment, and the selection module is specifically configured to, if isolation of a current working RRU set of the user equipment is smaller than, or smaller than or equal to the preset isolation threshold, combine an RRU corresponding to a next measurement information value in the sorted order into the current working RRU set of the user equipment, and continue to calculate isolation of a current working RRU set of the user equipment, and if the isolation of the current working RRU set of the user equipment is greater than or equal to, or greater than the preset isolation threshold, or when an RRU corresponding to a last measurement information value in the sorted order is combined into the current working RRU set of the user equipment, stop verification.

Optionally, this embodiment further includes the sorting is sorting in ascending order, the RRU set is a working RRU set, and the initial RRU set is an initial working RRU set, the initialization module is specifically configured to: use a set of all the RRUs in the cell as the initial working RRU set of the user equipment, and the selection module is specifically configured to, if isolation of a current working RRU set of the user equipment is greater than, or greater than or equal to the preset isolation threshold, remove an RRU corresponding to a smallest measurement information value in the current working RRU set of the user equipment from the current working RRU set of the user equipment, and continue to calculate isolation of a current working RRU set of the user equipment, and if the isolation of the current working RRU set of the user equipment is smaller than or equal to, or smaller than the preset isolation threshold, or when only an RRU corresponding to a last measurement information value in the sorted order is left in the current working RRU set of the user equipment, stop verification.

Optionally, this embodiment further includes the sorting is sorting in ascending order, the RRU set is a non-working RRU set, and the initial RRU set is an initial non-working RRU set, the initialization module is specifically configured to: use a null set as an initial non-working RRU set of the user equipment, and the selection module is specifically configured to, if isolation of a current non-working RRU set of the user equipment is greater than, or greater than or equal to the preset isolation threshold, combine an RRU corresponding to a next measurement information value in the sorted order into the current non-working RRU set of the user equipment, and continue to calculate isolation of a current non-working RRU set of the user equipment, and if the isolation of the current non-working RRU set of the user equipment is smaller than or equal to, or smaller than the preset isolation threshold, or when an RRU corresponding to a next-to-last measurement information value in the sorted order is combined into the current non-working RRU set of the user equipment, stop verification, and the base station further includes a calculation module 55, configured to calculate a complementary set of the non-working RRU set of the user equipment to obtain a working RRU set of the user equipment.

Optionally, this embodiment further includes the sorting is sorting in descending order, the RRU set is a non-working RRU set, and the initial RRU set is an initial non-working RRU set, the initialization module is specifically configured to: use a set of all the RRUs in the cell other than an RRU corresponding to a greatest measurement information value as an initial non-working RRU set of the user equipment, and the selection module is specifically configured to, if isolation of a current non-working RRU set of the user equipment is smaller than, or smaller than or equal to the preset isolation threshold, remove an RRU corresponding to a greatest measurement information value in the current non-working RRU set of the user equipment from the current non-working RRU set of the user equipment, and continue to calculate isolation of a current non-working RRU set of the user equipment, and if the isolation of the current non-working RRU set of the user equipment is greater than or equal to, or greater than the preset isolation threshold, or when only an RRU corresponding to a last measurement information value in the sorted order is left in the current non-working RRU set of the user equipment, stop verification, and the base station further includes a calculation module 55, configured to calculate a complementary set of the non-working RRU set of the user equipment to obtain a working RRU set of the user equipment.

Optionally, in this embodiment, the measurement information value is one or a combination of the following: a reference signal receiving power RSRP and a signal to interference plus noise ratio SINR.

Optionally, in this embodiment, the measurement information value is a reference signal receiving power RSRP, and by taking that the measurement information value is an RSRP as an example, the base station calculates the isolation of the current RRU set of the user equipment according to the following formula:

$$g = 10\log\left(\sum_{k=0}^{m} 10^{\frac{RSRP_k}{10}}\right) - 10\log\left(\sum_{k=m+1}^{N-1} 10^{\frac{RSRP_k}{10}}\right)$$

$$= 10\log\left(\frac{\sum_{k=0}^{m} 10^{\frac{RSRP_k}{10}}}{\sum_{k=m+1}^{N-1} 10^{\frac{RSRP_k}{10}}}\right),$$

where g is the isolation of the current RRU set of the user equipment, N is the number of all the RRUs in the cell, k is a number of an RRU in the sorted order, $RSRP_k$ is an RSRP value of an RRU numbered with k, and the current RRU set of the user equipment is the first m+1 RRUs in the sorted order.

Figure 5B:
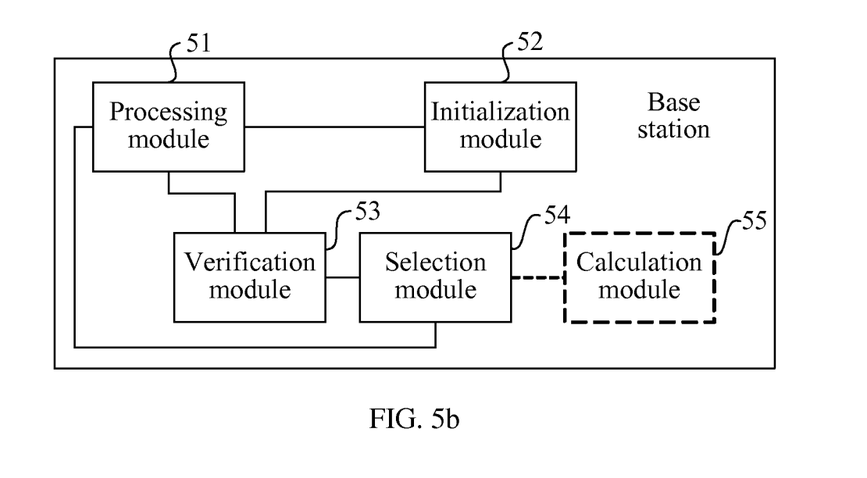
FIG. 5b is a schematic structural diagram of another base station according to an embodiment of the present invention.
Figure 5C:
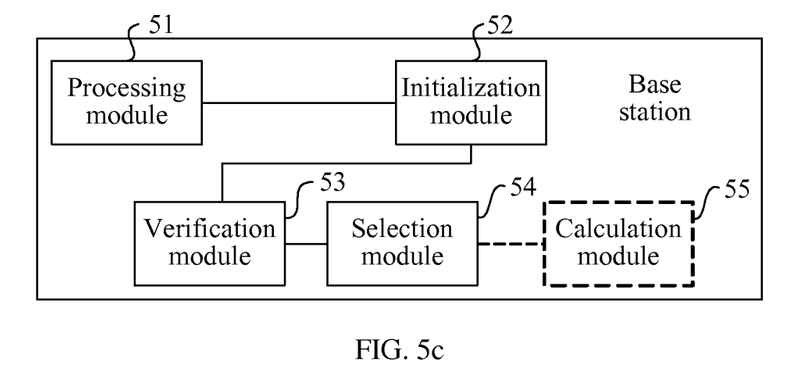
FIG. 5c is a schematic structural diagram of another base station according to an embodiment of the present invention.

Optionally, a logical connection relationship between the modules in the base station according to this embodiment may also be as shown in FIG. 5b or FIG. 5c, which is not described in this embodiment again.

Embodiment 6

Figure 6:
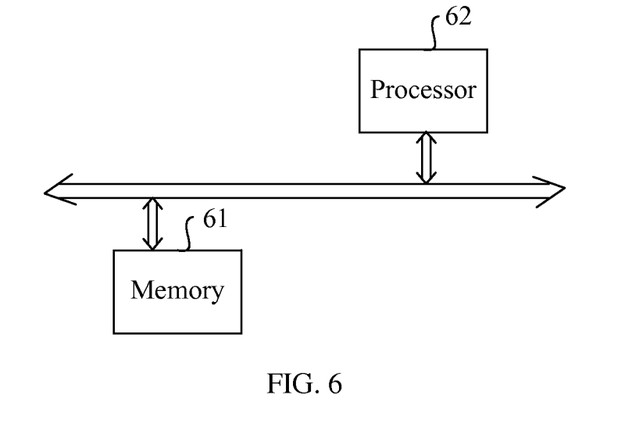
FIG. 6 is a schematic structural diagram of another base station according to an embodiment of the present invention.

FIG. 6 shows a base station for selecting a working RRU for a user equipment according to an embodiment of the present invention. As shown in the figure, the base station includes a memory 61, configured to store a process code for the base station to select a working RRU for a user equipment, and a processor 62, configured to sort measurement information values of all RRUs in a cell for the user equipment, determine an initial RRU set of the user equipment, sequentially calculate isolation of a current RRU set of the user equipment starting from the initial RRU set according to the measurement information values in the sorted order, and sequentially determine, according to whether the isolation of the current RRU set of the user equipment satisfies a preset isolation threshold, whether RRUs corresponding to the measurement information values in the sorted order are working RRUs of the user equipment.

This embodiment further includes the sorting is sorting in descending order, the RRU set is a working RRU set, and the initial RRU set is an initial working RRU set, the initialization module is specifically configured to: use an RRU corresponding to a greatest measurement information value as the initial working RRU set of the user equipment, and the selection module is specifically configured to, if isolation of a current working RRU set of the user equipment is smaller than, or smaller than or equal to the preset isolation threshold, combine an RRU corresponding to a next measurement information value in the sorted order into the current working RRU set of the user equipment, and continue to calculate isolation of a current working RRU set of the user equipment, and if the isolation of the current working RRU set of the user equipment is greater than or equal to, or greater than the preset isolation threshold, or when an RRU corresponding to a last measurement information value in the sorted order is combined into the current working RRU set of the user equipment, stop verification.

Optionally, this embodiment further includes the sorting is sorting in ascending order, the RRU set is a working RRU set, and the initial RRU set is an initial working RRU set, the initialization module is specifically configured to use a set of all the RRUs in the cell as the initial working RRU set of the user equipment, and the selection module is specifically configured to, if isolation of a current working RRU set of the user equipment is greater than, or greater than or equal to the preset isolation threshold, remove an RRU corresponding to a smallest measurement information value in the current working RRU set of the user equipment from the current working RRU set of the user equipment, and continue to calculate isolation of a current working RRU set of the user equipment, and if the isolation of the current working RRU set of the user equipment is smaller than or equal to, or smaller than the preset isolation threshold, or when only an RRU corresponding to a last measurement information value in the sorted order is left in the current working RRU set of the user equipment, stop verification.

Optionally, this embodiment further includes the sorting is sorting in ascending order, the RRU set is a non-working RRU set, and the initial RRU set is an initial non-working RRU set, the initialization module is specifically configured to: use a null set as an initial non-working RRU set of the user equipment, and the selection module is specifically configured to, if isolation of a current non-working RRU set of the user equipment is greater than, or greater than or equal to the preset isolation threshold, combine an RRU corresponding to a next measurement information value in the sorted order into the current non-working RRU set of the user equipment, and continue to calculate isolation of a current non-working RRU set of the user equipment, and if the isolation of the current non-working RRU set of the user equipment is smaller than or equal to, or smaller than the preset isolation threshold, or when an RRU corresponding to a next-to-last measurement information value in the sorted order is combined into the current non-working RRU set of the user equipment, stop verification, and the base station further includes a calculation module 55, configured to calculate a complementary set of the non-working RRU set of the user equipment to obtain a working RRU set of the user equipment.

Optionally, this embodiment further includes the sorting is sorting in descending order, the RRU set is a non-working RRU set, and the initial RRU set is an initial non-working RRU set, the initialization module is specifically configured to: use a set of all the RRUs in the cell other than an RRU corresponding to a greatest measurement information value as an initial non-working RRU set of the user equipment, and the selection module is specifically configured to, if isolation of a current non-working RRU set of the user equipment is smaller than, or smaller than or equal to the preset isolation threshold, remove an RRU corresponding to a greatest measurement information value in the current non-working RRU set of the user equipment from the current non-working RRU set of the user equipment, and continue to calculate isolation of a current non-working RRU set of the user equipment, and if the isolation of the current non-working RRU set of the user equipment is greater than or equal to, or greater than the preset isolation threshold, or when only an RRU corresponding to a last measurement information value in the sorted order is left in the current non-working RRU set of the user equipment, stop verification, and the base station further includes a calculation module 55, configured to calculate a complementary set of the non-working RRU set of the user equipment to obtain a working RRU set of the user equipment.

Optionally, in this embodiment, the measurement information value is one or a combination of the following: a reference signal receiving power RSRP and a signal to interference plus noise ratio SINR.

Optionally, in this embodiment, the measurement information value is a reference signal receiving power RSRP, and by taking that the measurement information value is an RSRP as an example, the base station calculates the isolation of the current RRU set of the user equipment according to the following formula:

$$g = 10\log\left(\sum_{k=0}^{m} 10^{\frac{RSRP_k}{10}}\right) - 10\log\left(\sum_{k=m+1}^{N-1} 10^{\frac{RSRP_k}{10}}\right)$$

$$= 10\log\left(\frac{\sum_{k=0}^{m} 10^{\frac{RSRP_k}{10}}}{\sum_{k=m+1}^{N-1} 10^{\frac{RSRP_k}{10}}}\right),$$

where g is the isolation of the current RRU set of the user equipment, N is the number of all the RRUs in the cell, k is a number of an RRU in the sorted order, $RSRP_k$ is an RSRP value of an RRU numbered with k, and the current RRU set of the user equipment is the first m+1 RRUs in the sorted order.

Persons of ordinary skill in the art may realize that, units and algorithm steps of each example described in the embodiments disclosed herein can be implemented by electronic hardware, computer software, or a combination of the two. In order to clearly describe the interchangeability between the hardware and the software, compositions and steps of each example have been generally described according to functions in the foregoing descriptions. Whether these functions are executed in a hardware or software manner depends upon particular applications and design constraint conditions of the technical solutions. Persons skilled in the art may use a different method to implement a described function for each particular application, but it should not be considered that such implementation goes beyond the scope of the present invention.

It may be clearly understood by persons skilled in the art that, for the purpose of convenient and brief description, for a detailed working process of the foregoing system, apparatus and unit, reference may be made to a corresponding process in the method embodiments, which is not described herein again.

In several embodiments provided in the present application, it should be understood that the disclosed system, apparatus, and method may be implemented in other ways. For example, the described apparatus embodiments are only exemplary. For example, the unit division is only logical function division and can be other division in actual implementation. For example, multiple units or components may be combined or integrated into another system, or some features may be ignored or not performed. In addition, the shown or discussed coupling or direct coupling or communication connections may be accomplished through some interfaces, and indirect coupling or communication connections between apparatuses or units may be electrical, mechanical, or in other forms.

Units described as separate components may be or may not be physically separate. Components shown as units may be or may not be physical units, that is, may be located in one place, or may also be distributed on multiple network units. Some or all of the modules may be selected to achieve the objectives of the solutions in the embodiments of the present invention according to an actual requirement.

In addition, various functional units according to each embodiment of the present invention may be integrated in one processing unit or may exist as various separate physical units, or two or more units may also be integrated in one unit. The integrated unit may be implemented in a hardware manner, or may also be implemented in the form of a software functional module.

When the integrated unit is implemented in the form of a software functional unit and sold or used as a separate product, the integrated unit may be stored in a computer readable storage medium. Based on such an understanding, the technical solutions of the present invention substantially or the part that makes contributions to the prior art, or all or a part of the technical solutions may be embodied in the form of a software product. The computer software product is stored in a storage medium, which includes several instructions used to instruct a computer device (which may be a personal computer, a server, or a network device) to perform all or a part of steps of the methods described in the embodiments of the present invention. The storage medium includes various media capable of storing program codes, such as, a USB flash disk, a mobile hard disk, a read-only memory (ROM), a random access memory (RAM), a magnetic disk, or an optical disk.

It should be understood that, the technical solutions in the embodiments of the present invention may be applied to a long term evolution (referred to as "LTE") system, an LTE frequency division duplex (referred to as "FDD") system, an LTE time division duplex (referred to as "TDD") system, a universal mobile telecommunication system (referred to as "UMTS"), a worldwide interoperability for microwave access (referred to as "WiMAX") communication system, a microwave communication system, and the like.

The foregoing descriptions are only specific embodiments of the present invention, but are not intended to limit the protection scope of the present invention. Equivalent modifications or replacements that may be readily figured out by persons skilled in the art within the technical scope disclosed in the present invention shall all fall within the protection scope of the present invention. Therefore, the protection scope of the present invention shall be subject to that of the claims.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method implemented by a base station for selecting a working remote radio unit (RRU) set for a user equipment, the method comprising:
   determining a first RRU set of the user equipment according to measurement information values of all RRUs in a cell;
   calculating a first isolation between the first RRU set and first remaining RRUs, wherein the first remaining RRUs are RRUs in the cell outside the first RRU set;
   changing the first RRU set according to the first isolation calculating result; and
   determining the working RRU set of the user equipment according to the first RRU set.

2. The method according to claim 1, wherein the first RRU set is an RRU corresponding to a greatest measurement information value in all the RRUs in the cell, and wherein changing the first RRU set according to the first isolation calculating result comprises:
   when the first isolation is smaller than a preset isolation threshold, performing step A: combining an RRU corresponding to a greatest measurement information value in the remaining RRUs into the first RRU set to derive a second RRU set, and continuing to calculate second isolation between the second RRU set and second remaining RRUs, wherein the second remaining RRUs are RRUs in the cell outside the second RRU set;
   when the first isolation is greater than the preset isolation threshold, or when all RRUs in the cell are combined into the first RRU set, performing step B: determining the first RRU set as the working RRU set for the user equipment; and
   when the first isolation is equal to the preset isolation threshold, performing step A or B.

3. The method according to claim 1, wherein the first RRU set is a set of all the RRUs in the cell, and wherein changing the first RRU set according to the first isolation calculating result comprises:
   when the first isolation is greater than a preset isolation threshold, performing step A: removing an RRU corresponding to a smallest measurement information value in the first RRU set from the first RRU set to derive a second RRU set, and continuing to calculate second isolation between the second RRU set and second remaining RRUs, wherein the second remaining RRUs are RRUs in the cell outside the second RRU set;
   when the first isolation is smaller than the preset isolation threshold, or when only an RRU corresponding to a greatest measurement information value in all the RRUs in the cell is left in the first RRU set, performing step B: determining the first RRU set as the working RRU set for the user equipment; and
   when the first isolation is equal to the preset isolation threshold, performing step A or B.

4. The method according to claim 1, wherein the first RRU set is a null set, and wherein changing the first RRU set according to the first isolation calculating result comprises:
   when the first isolation is greater than a preset isolation threshold, performing step A: combining an RRU corresponding to a smallest measurement information value in the first remaining RRUs into the first RRU set to derive a second RRU set, and continuing to calculate second isolation between a second current RRU set and second remaining RRUs, wherein the second remaining RRUs are RRUs in the cell outside the second RRU set;
   when the first isolation is smaller than the preset isolation threshold, or when all the RRUs in the cell other than an RRU corresponding to a greatest measurement information value are combined into the first RRU set, performing step B: determining a complementary set of the first RRU set as the working RRU set for the user equipment; and
   when the first isolation is equal to the preset isolation threshold, performing step A or B.

5. The method according to claim 1, wherein the first RRU set is a set of all the RRUs in the cell other than an RRU corresponding to a greatest measurement information value, and wherein changing the first RRU set according to the first isolation calculating result comprises:
   when the first isolation is smaller than a preset isolation threshold, performing step A: removing an RRU corresponding to a greatest measurement information value in the first RRU set from the first RRU set to derive a second RRU set, and continuing to calculate second isolation between the second RRU set and second remaining RRUs, wherein the second remaining RRUs are RRUs in the cell outside the second RRU set;
   when the second isolation is greater than the preset isolation threshold, or when only an RRU corresponding to a smallest measurement information value in all the RRUs in the cell is left in the first RRU set, performing step B:

determining a complementary set of the first RRU set as the working RRU set for the user equipment; and when the first isolation is equal to the preset isolation threshold, performing step A or B.

6. The method according to claim 1, wherein the measurement information value is one or a combination of the following parameters: a reference signal receiving power RSRP and a signal to interference plus noise ratio SINR.

7. The method according to claim 1, wherein, before the determining the first RRU set of the user equipment according to measurement information values of all RRUs in a cell, the method further comprises:

sorting all of the RRUs in the cell according to the measurement information values of all the RRUs in the cell in ascending or descending order;

wherein a method for calculating isolation is expressed as:

$g=f$(measurement information value (0), measurement information value (1), . . . , measurement information value $(m)$)−$f$(measurement information value $(m+1)$, measurement information value $(m+2)$, . . . , measurement information value $(N−1)$), wherein $g$ is the isolation of a current RRU set, $N$ is the number of all the RRUs in the cell, f is a method function for converting a combined value of measurement information values into an equivalent measurement value, and the current RRU set is a first $m+1$ RRUs in the sorted order.

8. The method according to claim 1, wherein the measurement information value is a reference signal receiving power RSRP; and a method for calculating isolation is expressed as:

$$g = 10\log\left(\sum_{k=0}^{m} 10^{\frac{RSRP_k}{10}}\right) - 10\log\left(\sum_{k=m+1}^{N-1} 10^{\frac{RSRP_k}{10}}\right)$$

$$= 10\log\left(\frac{\sum_{k=0}^{m} 10^{\frac{RSRP_k}{10}}}{\sum_{k=m+1}^{N-1} 10^{\frac{RSRP_k}{10}}}\right),$$

wherein g is an isolation of a current RRU set; N is a number of all the RRUs in the cell; k is a number of an RRU in a sorted order; RSRPk is an RSRP value of an RRU numbered with k; and the current RRU set is a first m+1 RRUs in the sorted order.

9. A base station, that selects a working remote radio unit (RRU) set for a user equipment, the base station comprising:

a memory that stores a process code for the base station to select the working RRU set for the user equipment; and a processor that determines a first RRU set of the user equipment according to measurement information values of all RRUs in a cell, calculates first isolation between the first RRU set and first remaining RRUs, wherein the first remaining RRUs are RRUs in the cell outside the first RRU set, changes the first RRU set according to the first isolation calculating result, and determines the working RRU set of the user equipment according to the first RRU set.

10. The base station according to claim 9, wherein the first RRU set is an RRU corresponding to a greatest measurement information value in all the RRUs in the cell; and the processor is specifically configured to:

when the first isolation is smaller than a preset isolation threshold, perform step A: combining an RRU corresponding to a greatest measurement information value in the remaining RRUs into the first RRU set to derive a second RRU set, and continuing to calculate second isolation between the second RRU set and second remaining RRUs, wherein the second remaining RRUs are RRUs in the cell outside the second RRU set;

when the first isolation is greater than the preset isolation threshold, or when all RRUs in the cell are combined into the first RRU set, perform step B: determining the first RRU set as the working RRU set for the user equipment; and when the first isolation is equal to the preset isolation threshold, perform step A or B.

11. The base station according to claim 9, wherein the first RRU set is a set of all the RRUs in the cell; and the processor is specifically configured to:

when the first isolation is greater than a preset isolation threshold, perform step A: removing an RRU corresponding to a smallest measurement information value in the first RRU set from the first RRU set to derive a second RRU set, and continuing to calculate second isolation between the second RRU set and second remaining RRUs, wherein the second remaining RRUs are RRUs in the cell outside the second RRU set;

when the first isolation is smaller than the preset isolation threshold, or when only an RRU corresponding to a greatest measurement information value in all the RRUs in the cell is left in the first RRU set, perform step B: determining the first RRU set as the working RRU set for the user equipment; and when the first isolation is equal to the preset isolation threshold, perform step A or B.

12. The base station according to claim 9, wherein the first RRU set is a null set; and the processor is specifically configured to:

when the first isolation is greater than a preset isolation threshold, perform step A: combining an RRU corresponding to a smallest measurement information value in the first remaining RRUs into the first RRU set to derive a second RRU set, and continuing to calculate second isolation between a second current RRU set and second remaining RRUs, wherein the second remaining RRUs are RRUs in the cell outside the second RRU set;

when the first isolation is smaller than the preset isolation threshold, or when all the RRUs in the cell other than an RRU corresponding to a greatest measurement information value are combined into the first RRU set, perform step B: determining a complementary set of the first RRU set as the working RRU set for the user equipment; and when the first isolation is equal to the preset isolation threshold, perform step A or B.

13. The base station according to claim 9, wherein the first RRU set is a set of all the RRUs in the cell other than an RRU corresponding to a greatest measurement information value; and the processor is specifically configured to:

when the first isolation is smaller than a preset isolation threshold, perform step A: removing an RRU corresponding to a greatest measurement information value in the first RRU set from the first RRU set to derive a second RRU set, and continuing to calculate second isolation between the second RRU set and second remaining RRUs, wherein the second remaining RRUs are RRUs in the cell outside the second RRU set;

when the second isolation is greater than the preset isolation threshold, or when only an RRU corresponding to a smallest measurement information value in all the RRUs in the cell is left in the first RRU set, perform step B: determining a complementary set of the first RRU set as the working RRU set for the user equipment; and when the first isolation is equal to the preset isolation threshold, perform step A or B.

14. The base station according to claim 9, wherein the measurement information value is one or a combination of the following parameters:
a reference signal receiving power RSRP, and a signal to interference plus noise ratio SINR.

15. The base station according to claim 9, wherein the processor is further configured to sort all of the RRUs in the cell according to the measurement information values of all the RRUs in the cell in ascending or descending order; wherein a method for the processor to calculate isolation is expressed as:

$g = f$(measurement information value (0), measurement information value (1), ..., measurement information value $(m)$)$-f$(measurement information value $(m+1)$, measurement information value $(m+2)$, ..., measurement information value $(N-1)$), wherein $g$ is the isolation of a current RRU set, $N$ is the number of all the RRUs in the cell, $f$ is a method function for converting a combined value of measurement information values into an equivalent measurement value, and the current RRU set is a first $m+1$ RRUs in the sorted order.

16. The base station according to claim 9, wherein the measurement information value is a reference signal receiving power RSRP; and a method for the processor to calculate the isolation is expressed as:

$$g = 10\log\left(\sum_{k=0}^{m} 10^{\frac{RSRP_k}{10}}\right) - 10\log\left(\sum_{k=m+1}^{N-1} 10^{\frac{RSRP_k}{10}}\right)$$
$$= 10\log\left(\frac{\sum_{k=0}^{m} 10^{\frac{RSRP_k}{10}}}{\sum_{k=m+1}^{N-1} 10^{\frac{RSRP_k}{10}}}\right),$$

wherein g is an isolation of a current RRU set; N is a number of all the RRUs in the cell; k is a number of an RRU in a sorted order; RSRPk is an RSRP value of an RRU numbered with k; and the current RRU set is a first m+1 RRUs in the sorted order.

17. A method implemented by a base station for selecting a working remote radio unit (RRU) set for a user equipment, the method comprising:
determining a first RRU set of the user equipment according to measurement information values of all RRUs in a cell;
calculating a first isolation between the first RRU set and first remaining RRUs, wherein the first remaining RRUs are RRUs in the cell outside the first RRU set; and
determining the working RRU set for the user equipment according to the first isolation calculating result;
wherein the first RRU set is an RRU set corresponding to a greatest measurement information value in all the RRUs in the cell, and wherein determining the working RRU set for the user equipment according to the first isolation calculating result comprises:

when the first isolation is smaller than a preset isolation threshold, performing step A: combining an RRU corresponding to a greatest measurement information value in the remaining RRUs into the first RRU set to derive a second RRU set, and continuing to calculate second isolation between the second RRU set and second remaining RRUs, wherein the second remaining RRUs are RRUs in the cell outside the second RRU set;

when the first isolation is greater than the preset isolation threshold, or when all RRUs in the cell are combined into the first RRU set, performing step B: determining the first RRU set as the working RRU set for the user equipment; and when the first isolation is equal to the preset isolation threshold, performing step A or B.

18. The method according to claim 17, wherein the measurement information value comprises a reference signal receiving power RSRP or a signal to interference plus noise ratio SINR.

19. The method according to claim 17, wherein, before the determining the first RRU set of the user equipment according to measurement information values of all RRUs in a cell, the method further comprises:
sorting all of the RRUs in the cell according to the measurement information values of all the RRUs in the cell in ascending or descending order;
wherein a method for calculating isolation is expressed as:

$g = f$(measurement information value (0), measurement information value (1), ..., measurement information value $(m)$)$-f$(measurement information value $(m+1)$, measurement information value $(m+2)$, ..., measurement information value $(N-1)$), wherein $g$ is the isolation of a current RRU set, $N$ is the number of all the RRUs in the cell, $f$ is a method function for converting a combined value of measurement information values into an equivalent measurement value, and the current RRU set is a first $m+1$ RRUs in the sorted order.

20. The method according to claim 17, wherein the measurement information value is a reference signal receiving power RSRP and a method for calculating isolation is expressed as:

$$g = 10\log\left(\sum_{k=0}^{m} 10^{\frac{RSRP_k}{10}}\right) - 10\log\left(\sum_{k=m+1}^{N-1} 10^{\frac{RSRP_k}{10}}\right)$$
$$= 10\log\left(\frac{\sum_{k=0}^{m} 10^{\frac{RSRP_k}{10}}}{\sum_{k=m+1}^{N-1} 10^{\frac{RSRP_k}{10}}}\right),$$

wherein g is an isolation of a current RRU set, N is a number of all the RRUs in the cell, k is a number of an RRU in a sorted order; RSRPk is an RSRP value of an RRU numbered with k, and the current RRU set is a first m+1 RRUs in the sorted order.

* * * * *